United States Patent [19]

Rädecke

[11] 3,708,753

[45] Jan. 2, 1973

[54] PRODUCING VERTICAL APERTURE CORRECTION SIGNALS FOR TELEVISION IMAGE TRANSMITTERS

[75] Inventor: Helmut Rädecke, Darmstadt, Germany

[73] Assignee: Fernseh GmbH, Darmstadt, Germany

[22] Filed: April 6, 1971

[21] Appl. No.: 131,719

[30] Foreign Application Priority Data

April 29, 1970 Germany....................P 20 20 861.1

[52] U.S. Cl...............328/162, 328/164, 178/DIG. 25

[51] Int. Cl...............H03b 1/00

[58] Field of Search......................328/162, 163, 164; 178/DIG. 25

[56] References Cited

UNITED STATES PATENTS

| | | | |
|---|---|---|---|
| 2,757,236 | 7/1956 | Bedford | 178/7.5 R |
| 3,153,207 | 10/1964 | Brown | 328/163 |
| 3,444,318 | 5/1969 | Monteath | 178/7.2 |

FOREIGN PATENTS OR APPLICATIONS

| | | | |
|---|---|---|---|
| 1,197,097 | 7/1970 | Great Britain | 178/DIG. 25 |

*Primary Examiner*—James W. Lawrence
*Assistant Examiner*—Harold A. Dixon
*Attorney*—Littlepage, Quaintance, Wray & Aisenberg

[57] ABSTRACT

Production of a vertical aperture correction signal for studio-type television-image transmitters. A fist video signal $A_0$ is delayed one video line period to produce a signal $A_1$. These signals are compared to produce a signal $A_1$–$A_0$, which is passed through a low-pass filter and delayed another line period to produce a signal $A_2$–$A_1$. Signals $A_1$–$A_0$ and $A_2$–$A_1$ are compared to produce the correction signal.

8 Claims, 2 Drawing Figures

Fig. 2

Inventor:
Helmut Rädecke
by James Wray
Attorney

PRODUCING VERTICAL APERTURE CORRECTION SIGNALS FOR TELEVISION IMAGE TRANSMITTERS 08400110

BACKGROUND OF THE INVENTION

This invention relates to circuits for producing a vertical aperture correction signal, which can be used in studio installations in conjunction with television image transmitters to improve the frequency characteristic of a television signal.

In the known method for vertical aperture correction, a correction signal is formed from three components. Half the sum of an undelayed video signal $A_0$ and a video signal $A_2$ which is delayed by two line periods is subtracted from a video signal $A_1$ which is delayed by one video line period. This produces a correction signal at times when there is no correlation between at least two of the three signals. The correction signal is then mixed as a contour-improving signal, to the signal $A_1$ which has been delayed by one line period. This method however suffers from a number of disadvantages.

All three signals $A_0$, $A_1$ and $A_2$ must have precisely defined amplitudes of high constancy. Otherwise, in addition to the required correction signal, there are also produced signal components in the regions in which the line contents are correlated and, hence, in which no components should be produced.

Signal distortions such as non-linearity and sharp peaks also result in interference signal components in the correction signal, in the regions of correlated line periods. Therefore the delay elements used must have good transmission properties.

The limitation of the signal band width, which is desirably to be effected, for example with a 2+ MHz low-pass filter, must have the same characteristic for all three signals $A_0$, $A_1$ and $A_2$. Otherwise, edge effects occur at all horizontal signal transients, and asymmetrical components are formed in correlated periods.

SUMMARY OF THE INVENTION

It is the aim of the invention to avoid the above disadvantages by another comparison of signals and by another circuit arrangement.

According to the present invention there is provided a circuit for producing a vertical aperture correction signal, wherein a video difference signal $A_1-A_0$ is formed by comparing an undelayed signal $A_0$ and a signal $A_1$ which has been delayed by one video line period. A difference signal $A_1-A_0$ is delayed by a further line period to form a delayed signal $A_2-A_1$. The vertical aperture correction signal $A_1 - A_0+A_2/2$ is formed from said delayed signal and said difference signal.

If in fact the undelayed signal $A_0$, and the signal $A_1$ which is delayed by one line period, are subtracted from each other in the ratio 1:1, a signal is produced only in the non-correlated line periods; on the other hand, the information content in correlated periods is equal to zero. The asymmetrical correction component $A_1-A_0$ is now again delayed by one line period, possibly after band width restriction by means of a low-pass filter, and added with reversed polarity to the difference signal $A_1-A_0$ in the ratio 1:1. This sum precisely corresponds to the correction signal of the previous method. It has however the following advantages:

After the exact difference signal $A_1-A_0$ has been formed, subsequent amplification differences only affect the symmetry of the correction signal and do not result in undesired signal components in correlated line periods.

Signal distortions only influence the correction signal and do not result in interference signals in the region of correlated line periods.

A single low-pass filter is sufficient for band width restriction, whereby the same band width is ensured for the components of the correction signal.

The mean value of the difference signal $A_1-A_0$ is equal to zero and can easily be used for the amplification regulation of the first delay element, in that a corresponding regulation voltage is obtained for the amplifier, with a mean value which differs from zero. The requirements on the transmission properties of the second delay element can therefore be reduced.

One object of this invention is the producing of a correction signal by subtracting a second signal from a delayed first signal, subtracting a third signal from a delayed second signal and subtracting the second result from the delayed first result.

This invention has as another object the producing of a correction signal which is the result of subtractions of preliminary results, which are treated by a common low-pass filter.

Another object of the invention is the provision of circuits to carry out the method of the invention.

These and other objects are apparent in the disclosure which is the foregoing and ongoing specification, including the claims, and the drawing.

DETAILED DESCRIPTION OF THE DRAWING

Figure 1:
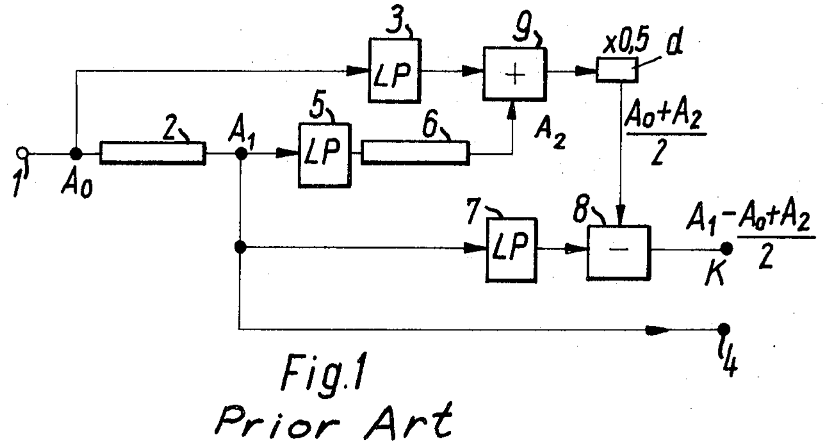
Fig.1 Prior Art
FIG. 1 shows the known circuit arrangement for producing a correction signal.

Reference will now be made to the accompanying drawing for further explanation of the invention. As shown in FIG. 1, in the known arrangement, a television signal applied to input terminal 1 is transmitted to two paths. One path includes a delay element 2 with a delay time of one line period. The second path includes a low-pass filter 3. A delayed signal $A_1$ appears at the output of the delay element 2. Delayed signal $A_1$ is transmitted to three paths: first, to an image signal output 4; second, to a series circuit comprising a low-pass filter 5 and a delay element 6; and, third, to a low-pass filter 7 and a differencing amplifier 8.

A signal $A_2$ delayed by two line periods appears at the output of the delay network 6, which signal $A_2$ is added in the adding amplifier 9 to the restricted bandwidth signal at the output of the low-pass filter 3. In a following attenuating member *d*, the amplitude is reduced to half, so that the signal $A_0+A_2/2$ is produced. This signal is then subtracted in the differencing amplifier 8 from the signal $A_1$, so as to produce the correction signal $A_1 - A_0+A_2/2$ at output K.

Figure 2:
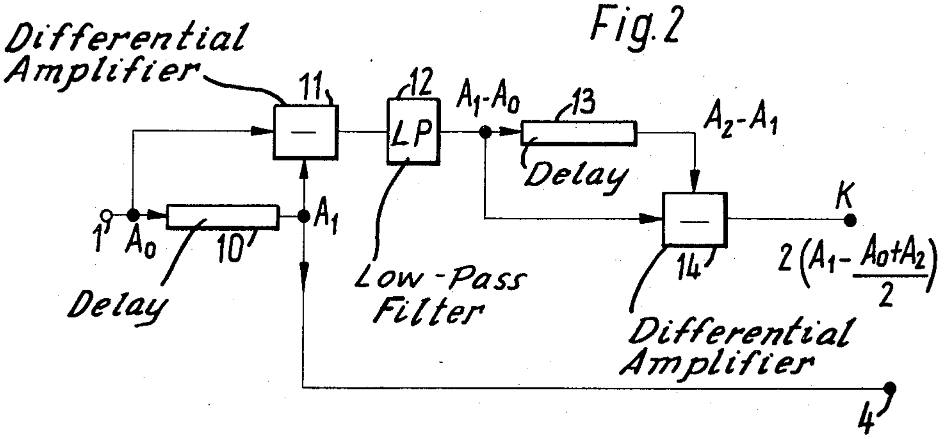
FIG. 2 shows the circuit arrangement according to the invention for producing the vertical aperture correction signal.

FIG. 2 shows the improved and simplified circuit in accordance with the invention, in diagrammatic form. The output signal $A_0$ passes through delay element 10, producing signal $A_1$ having a delay time of one line period. The signal $A_1$ passes directly to output 4. $A_1$ is applied to a differencing amplifier 11. The undelayed input $A_0$ is also applied to the differencing amplifier 11, and the signal $A_1-A_0$ is formed. After band-width restriction in a low-pass filter 12, the signal $A_1-A_0$ is again delayed by one line period in a delay element 13, thus forming the signal $A_2-A_1$. By subtraction of the latter from the former signal in the differencing amplifier 14, there is produced: $A_1-A_0-(A_2-A_1) = 2\,[A_1 - (A_0 + A_2/2)]$ so that the desired correction signal is produced at the terminal K.

The signal at K is then halved such as by passing through attenuating member d of FIG. 1, and the vertical aperture correction signal is used in the conventional manner.

The result is produced using a single low-pass filter as compared with several low-pass filters used in the prior art. Moreover, the correction signal is free from the disadvantages of the prior art, such as the production of signal components in which line contents are correlated. The correction signal is free of edge effects at horizontal signal transients and asymmetrical components formed in correlated periods.

While the invention has been particularly shown and described with reference to a preferred embodiment thereof, it will be understood by those skilled in the art that various changes in form and details may be made therein without departing from the spirit and scope of the invention.

What is claimed is:

1. The method for producing a vertical aperture correction signal comprising delaying a video signal $A_0$ by one video line duration to form a delayed signal $A_1$, comparing the delayed signal $A_1$ with signal $A_0$ to form a signal $A_1-A_0$, delaying signal $A_1-A_0$ by one video line duration to form a delayed signal $A_2-A_1$, and comparing the signals $A_2-A_1$ and $A_1-A_0$ to form a correction signal proportional to $A_1-A_0+A_2/2$.

2. The method of claim 1 further comprising passing the signal $A_1-A_0$ through a low-pass filter.

3. A method for producing a vertical aperture correction signal comprising forming a difference signal $A_1-A_0$ by comparing an undelayed signal $A_0$ and a signal $A_1$ which has been delayed by one line period, delaying the difference $A_1-A_0$, and forming a vertical aperture correction signal $A_1-A_0+A_2/2$ by comparing the delayed signal $A_2-A_1$ and the difference signal $A_1-A_{0a}$.

4. The method according to claim 3 further comprising restricting band width of the components of said correction signal by a common low-pass filter.

5. A method according to claim 3 wherein a degree of amplification in a first delay path is regulated by a voltage which is obtained by deriving a mean value of the difference signal.

6. A circuit for producing a vertical aperture correction comprising an input, a first time delay connected to the input, a first comparator connected to the first time delay and to the input, a second time delay connected to the first comparator, and a second comparator connected to the second time delay and to the first comparator, and an output connected to the second comparator.

7. The circuit of claim 6 further comprising a low-pass filter connected between the first comparator and the second time delay and connected between the first comparator and the second comparator, wherein the second time delay and the second comparator are connected to the first comparator via the low-pass filter.

8. The circuit of claim 6 wherein the first and second comparators comprise first and second differentiating amplifiers.

* * * * *